united states patent office 3,330,109
Patented July 11, 1967

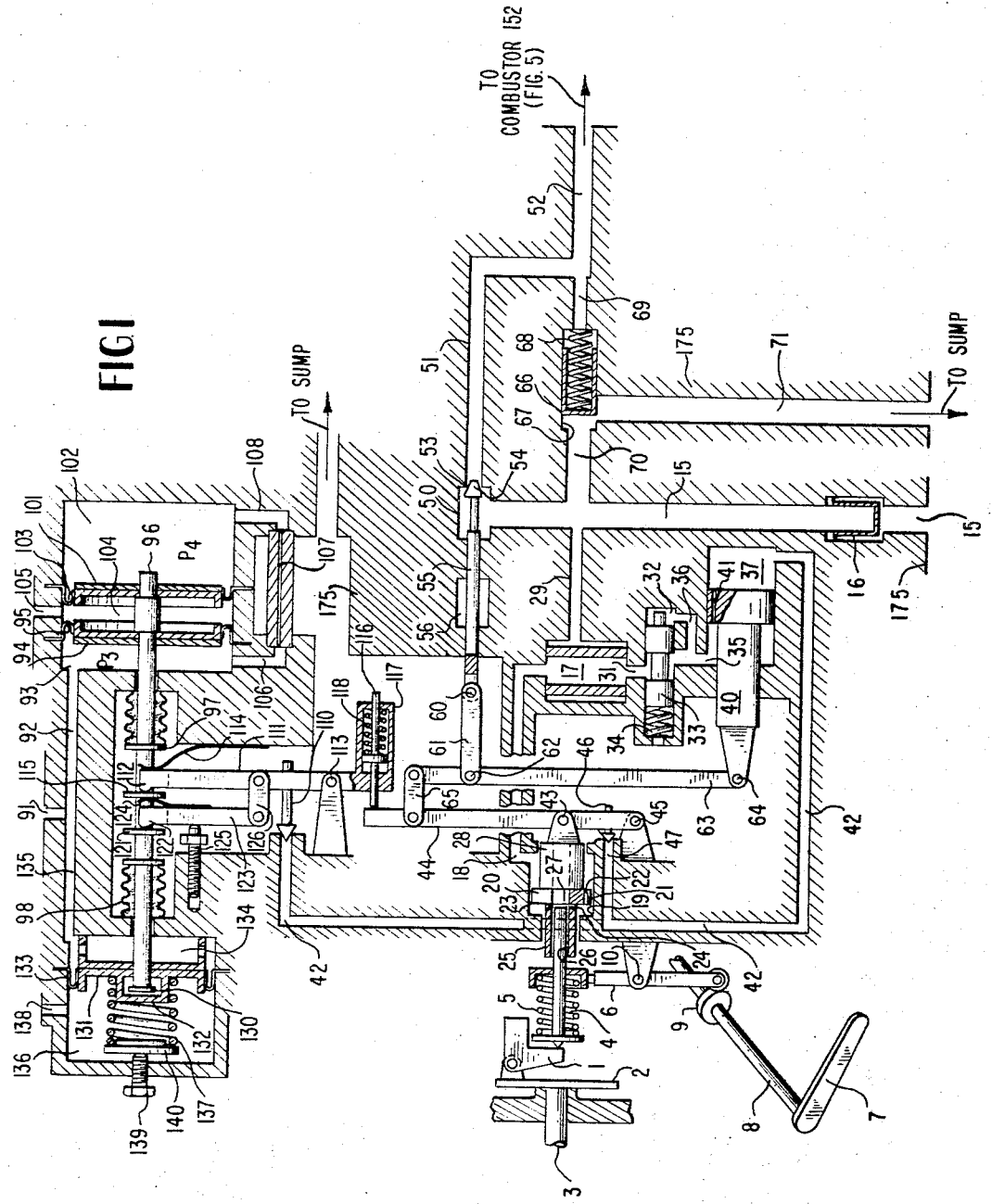

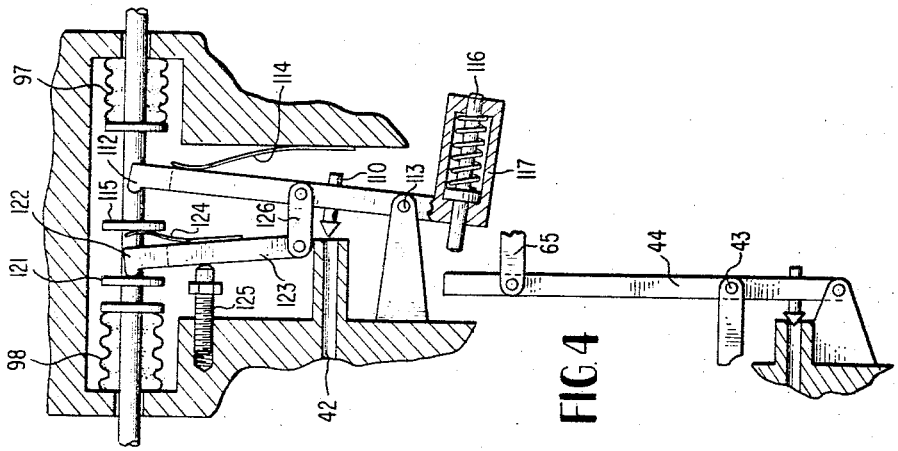
FIG. 4
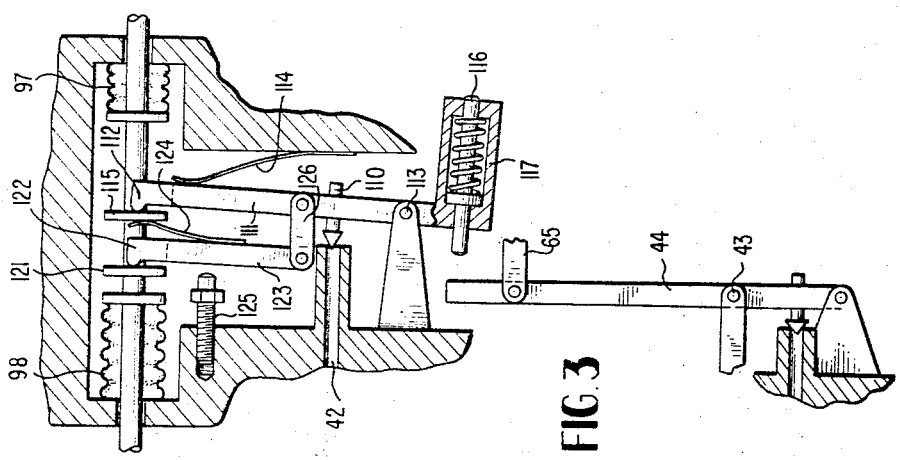
FIG. 3
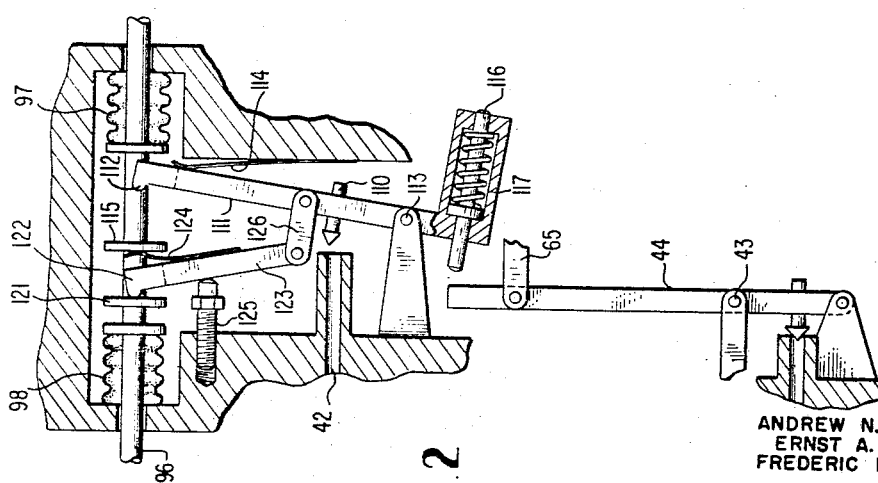
FIG. 2
INVENTORS
ANDREW N. CARRAS
ERNST A. NUSSBAUMER
FREDERIC E. BOLLIGER
BY 
ATTORNEYS

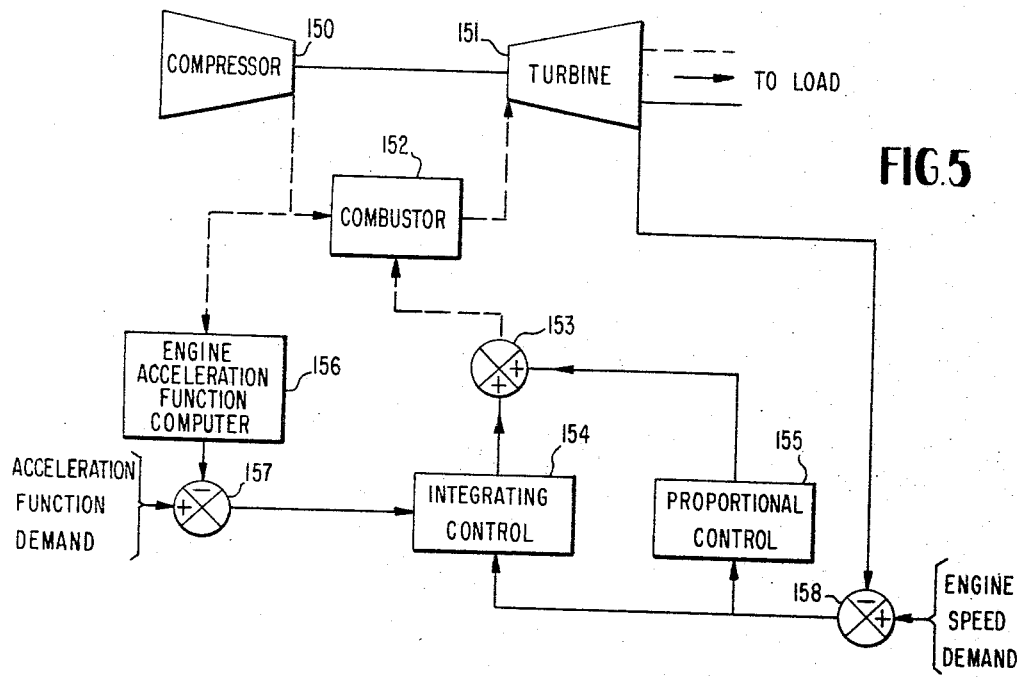
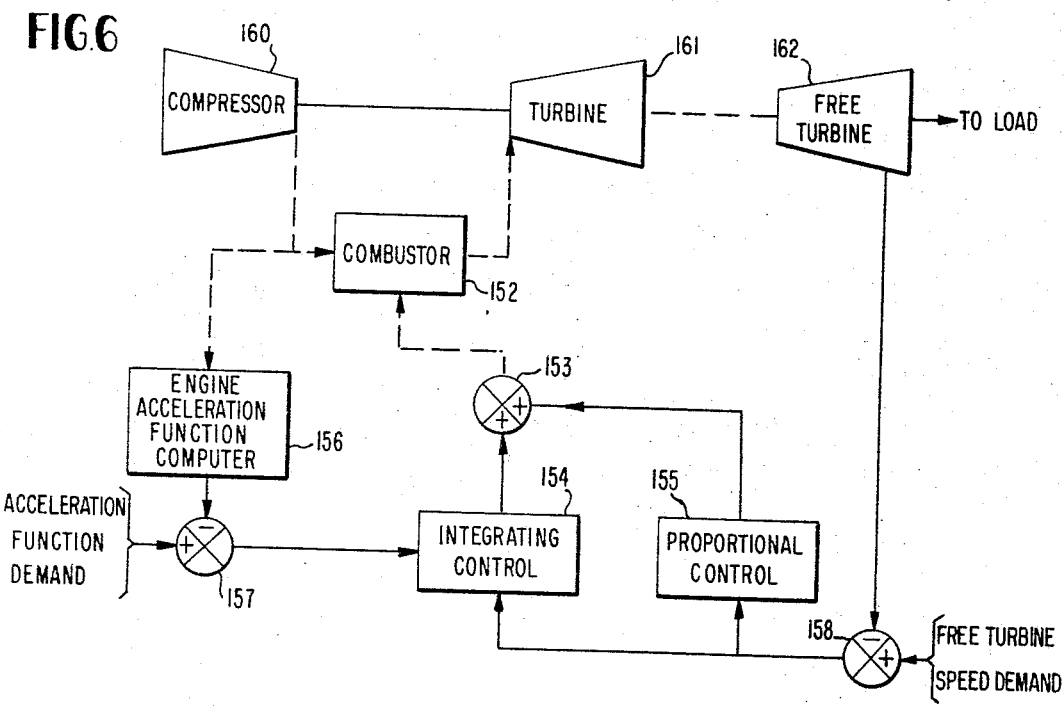

3,330,109
GAS TURBINE FUEL FLOW CONTROL SYSTEM
Andrew N. Carras, Silver Spring, Md., Ernst A. Nussbaumer, Washington, D.C., and Frederic E. Bolliger, Phoenix, Ariz., assignors to The Garrett Corporation, Los Angeles, Calif., a corporation of California
Filed July 21, 1964, Ser. No. 384,053
12 Claims. (Cl. 60—39.28)

The present invention relates to combustion turbine power plants, and is particularly directed to a novel system for controlling such plants during the subsistence of transient operating conditions, particularly those occurring during acceleration of the power plant in starting or in responding to increased power output demand. Additonally, the system of the present invention accomplishes the necessary adjustments in fuel flow where an enhanced power demand is required to be met at a substantially constant operating speed without acceleration.

As is well known, efficient operation of gas turbine power plants in general requires operation of the system under a regime closely approaching a limiting parameter. One such salient parameter is the permissible turbine inlet temperature. Another limiting condition with respect to which the present invention is most directly concerned is compressor surge.

Conventionally, these problems are solved by using a scheduled type of controller that senses and limits fuel flow to a function of preset corrected engine variables. The disadvantage of a scheduled controller is that in order for it to take full advantage of engine capabilities, it must of necessity sense ambient conditions and reset to non-linear defining functions. Such a controller must be tailored to the specific engine involved, limiting its application and adding both to its complexity and expense.

The present invention operates in combination with an engine speed responsive fuel flow control system. Under minor load variations, satisfactory engine operation is achieved in such a device. Such systems stabilize fuel flow at a rate usually determined by the force balance position of a centrifugal device acting against a speed reference spring pre-load force. In such a system, the operating speed may be manually or automatically selected by adjustment of the speed reference spring. Under minor load variations, the desired speed is maintained quite satisfactorily. Such a system can also be accommodated to gradually introduced speed change demands manually applied. Such a control system alone, however, demands very precise operation in effecting a wide band speed adjustment and is completely unsuitable for automatic starting.

When an acceleration, for instance, is demanded of such a speed sensor controlling fuel flow, flow is increased in an amount proportional to the speed error or the time integral thereof. With such arrangements, fuel flow would be increased to feed such an excess of fuel into the system as to result in the establishment of stall conditions in the absence of very careful manual handling. Obviously, such precision operation cannot be expected either in automatic starting systems or in many environments where manual control might be available.

The present invention provides an auxiliary modulator for fuel flow operative under transient conditions to permit large amplitude speed transients to be achieved in response to direct manipulation, either automatic or manual, of the speed sensor adjustment. The modulator of the present invention, furthermore, inherently tends to compensate for ambient pressure and ambient temperature variations. Additionally, it accommodates other variations such as changes in the heating value of the fuel, and in automatic starting provides independence of the condition of the starter battery. A closed loop type of acceleration control is provided using a signal encompassing an acceleration concept that automatically responds to ambient condition changes to provide a simple and sure means to obtain optimum engine response.

The objects of the present invention are, moreover, carried out by an exceedingly simple structure which is highly dependable as well as economic in manufacture.

It is accordingly the object of the present invention to provide for the modulation of fuel flow to a combustion power plant so as to maintain efficient surge-free operation during starting and during operating transients.

Our system provides an engine acceleration computer delivering as the basic output signal, a displacement proportional to the first derivative with respect to time of compressor discharge pressure over the sum of compressor discharge pressure and its first derivative. Our system thus has an outstanding advantage in that at low power ranges of the engine, there are provided large amplitude control signals because the denominator is small while the engine is accelerating slowly. On the other hand, at higher power ranges the compressor output pressure constitutes a large denominator term so that the control signal is not proportionately greater. Thus, it is possible in the system of the present invention, with little change in the amplitude of the demand signal, to accelerate the turbine slowly through the low power ranges where the operating band width, and between allowable acceleration and the limits prescribed by turbine inlet temperature and compressor discharge pressure, is narrow, while rapid acceleration is achieved at the high power ranges where the available band width is larger.

The invention will be further understood with reference to the appended drawings in which:

FIGURE 1 shows an exemplary embodiment of the invention as used in connection with a single shaft combustion turbine power plant, FIGURES 2, 3, and 4 show component operating elements of the fuel flow modulator in different operational positions, FIGURE 5 is a schematic showing of the invention as incorporated in a single shaft combustion turbine system, and FIGURE 6 is a schematic showing of the invention as embodied in a free turbine combustion power plant.

The control assembly shown in FIGURE 1 is adapted to operate a single shaft combustion turbine power plant. Exemplary applications of such power plants are with jet propelled aircraft, or as a prime mover supplying power by mechanical coupling from the combustion engine shaft itself. The specific application of the system shown in FIGURE 1 is to control a gas turbine driving an alternator. The primary design objectives are to bring the system up to speed as quickly as possible on starting with an acceleration limiting control, and to maintain that speed during load changes.

The control assembly of FIGURE 1 essentially operates in dependency on two engine variables, its rotational speed and the compressor discharge pressure. Additional components are normally provided to cut back the otherwise available fuel flow should the power plant develop excessive inlet temperatures to the turbine assembly. Since this type of safety system is entirely conventional, it is not shown in the drawings. The operating configuration of the mechanical elements shown in FIGURE 1 represent the conditions present when the power plant is operating at its design speed under load.

Under these circumstances, the fuel supply to the combustor nozzles is normally under the sole control of the engine speed sensor. This is diagrammatically illustrated in FIGURE 1 by centrifugal fly weight 1 mounted on disc 2 driven by shaft 3 which is mechanically coupled to the engine shaft either directly, or if desired, through ratio gearing. The force developed by fly weight 1 is received by spindle 4 constrained into engagement with fly weight 1 by spring 5. The longitudinal position of spindle 4 is determined by its assumption of an equilibrium position between the applied force from fly weight 1 and spring 5, the latter being controlled by adjustable arm 6 connected with a throttle control lever shown diagrammatically at 7 which operates to establish the engine speed demand signal input. Lever 7 is mounted on shaft 8 which carries cam 9 to control the position of arm 6 in its pivoted mount 10.

Spindle 4 operates to control a main engine fuel metering valve 54 through a hydraulic system including mechanically linked expansive chamber actuators.

In the embodiment of FIGURE 1, the source of hydraulic pressure is derived at main fuel pump line 15 which feeds the control assembly through a suitable filter 16, while line 15 provides a conduit for feeding engine fuel to the combustor nozzles, the control assembly itself derives its operating pressure from branch line 29 leading to a second filter element 17. The output from filter 17 is fed through conduit 18 to cylinder 19 in which positioning servo piston 20 operates under control of spindle 4.

For this purpose, piston 20 is provided with duct 21 and connecting orifice 22 leading therethrough. Fluid pressure may therefore enter through duct 18 into the right chamber within cylinder 19 and pass through orifice 22 into the chamber formed by cylinder 19 at the left of piston 20. Exit flow conditions from the left cylinder chamber are controlled by ports 23 and 24 extending radially through the smaller annular extension 25 formed on piston 20 to bore 26. Bore 26 extends completely through the piston assembly from one end to the other, and the left portion thereof receives spindle 4 in sliding and sealing engagement. The right portion of bore 26, in larger annular extension 28, provides an exit fluid sump for fluid passing through orifice 22 and, ultimately, ports 23 and 24. The effective flow through bores 23 and 24 is controlled by the position of spindle 4 whose end portion 27 coacts with the ports to form a control valve determining the longitudinal position of piston 20 in cylinder 19. Thus, if spindle 4 assumes the position as shown in FIGURE 1, and piston 20 is in a stable position longitudinally of the cylinder, the flow conditions through orifice 22 and ports 23 and 24 (the latter being partially closed by spindle 4) establish equilibrium of the forces tending to move the piston in opposite directions. If, under these circumstances, spindle 4 moves to the right, out-flow from the cylinder through ports 23 and 24 is reduced. The pressure rises in the cylinder chamber to the left of the piston 20, and the piston then moves to the right to increase out-flow through ports 23 and 24 until equilibrium is again established.

Conversely, if spindle 4 moves to the left, out-flow through ports 23 and 24 is increased. The pressure drops in the cylinder chamber to the left of piston 20, so that the piston moves to the left until equilibrium is reestablished. The power level and response of the piston depends on the pressure supplied in conduit 15 less the pressure losses incurred in filters 16 and 17.

The operation of the control assembly in dependency on the position of the speed responsive positioning servo piston 20 functions as follows. Pressurized fluid from filter 17 is fed through conduit 31 to a pressure regulator cylinder 32 containing a valve piston 33 biased by spring 34. Output conduit 35 from the pressure regulator cylinder is by-passed by conduit 36 back to the opposite end of the pressure regulator piston 33 to provide a stable constant output pressure at line 35 leading directly to integrator cylinder 37. This integrator cylinder contains a slidably mounted integrator piston 40 through which a restrictive orifice 41 is provided.

It will thus be seen that the integrator piston operates differentially in response to its volumetric flow rate difference between orifice 41 and outflow through line 42. Variations in pressure between the high pressure side fed by conduit 35 of the pressure regulator and the low pressure side feeding outflow conduit 42 are of an order to overcome the friction and inertia of the integrator and linkages, and are of such short duration that they may be ignored. Since pressure variations are minor, the flow (in.³/sec.) through orifice 41 is constant. If the outflow through conduit 42 is identical to this, the integrator will be at a standstill or steady state condition. If the exit conduit 42 is closed, piston 40 will move towards its left limit at a rate (in./sec.) corresponding to the flow through orifice 41 (in.³/sec.) times the inverse of piston 40 cross sectional area (in.⁻²). When exit flow through conduit 42 is larger than that available in orifice 41, the piston 40 will move towards its right limit.

Flow conditions in conduit 42 are directly responsive to the longitudinal position of piston 20 of the positioning servo as long as speed error is the only influence on fuel flow. For this purpose, the positioning servo piston 20 is linked at 43 to bar 44 pivoted on the control assembly chassis at 45.

Bar 44 carries adjustably threaded thereinto a plate valve member 46 which cooperates with the terminus of channel 47 fed from conduit 42. Thus, the movement of positioning servo piston 20 controls the outflow conditions from integrator cylinder 37 and this in turn controls the position of integrator piston 40 in dependency on the relative size of orifice 41 of the integrator cylinder and the exit flow area established by plate valve 46. The linkages through which the components thus described control fuel flow to the combustor chamber nozzles will now be described.

The main pump conduit 15 leading from the fuel pump communicates directly with valve chamber 50 leading through conduit 51 to supply conduit 52 feeding the combustor chamber nozzles (not shown). Conduit 51 is provided with valve seat 53 in relation to which the main fuel valve 54 operates. Valve 54 is received for longitudinal positioning in guide 55 and chamber 56 is provided to receive leakage around the valve stem and discharge the same by a conduit not shown in the drawing. Valve member 54 is pivoted at 60 to link 61 pivoted at its other end 62 to summing bar 63. The latter is pivoted at one end to the integrator piston 40 by pivot 64 and at its other end the summing bar is articulated by link 65 to member 44 whose position is determined by its coupling at 43 to positioning servo 20. The change in fuel flow per incremental speed error thus has proportional action through the articulation of summing bar 63 by link 65 and integral action through displacement of the bar by integrator piston 40 at pivot point 64.

In the operation of the main fuel valve 54, it is desired to maintain a constant pressure drop thereacross regardless of the flow conditions through this valve. If this is done and the area-displacement function characteristic of valve 54 is contoured linearly, the corrective action on fuel flow due to a speed error will also have a linear relationship, notwithstanding pressure variation in main fuel line 15 and position of valve 54. For this purpose, branch conduit 70 from the main fuel line 15 is led to a pressure regulator comprising valve member 66 slidably mounted in bore 67 and biased to the left by spring 68 and by nozzle fuel pressure supplied through line 69. By-passed fuel is returned to the pump supply via conduit 71.

The operation of the control assembly components thus far described is as follows. The speed sensor operating in dependency on the rotational velocity of shaft 3 and the position of throttle control 7 establish an operating position for positioning servo piston 20 which permits exit flow from integrator cylinder 37 through conduit 42 to plate valve 46. Orifice 41 in the integrator cylinder 40, being of predetermined size, permits the adjustment of plate valve 46 under any desired condition to equalize the flow through orifice 41 thus determining the steady state or zero velocity point of integrator piston 40. Component dimensions are so established in any specific application of the invention as to position the main fuel valve 54 to provide the desired fuel flow under control of summing bar 63 under control of positioning servo piston 20 and integrator piston 40.

Should the engine speed decrease, the positioning servo piston 20 will correspondingly move to the left and restrict outflow through plate valve 46 from integrator cylinder 37. This movement of positioning servo piston 20 will simultaneously move the upper end of summing bar 63 to the left to increase fuel flow, while at the same time the pressure increase resulting from constriction of exit flow through conduit 42 will cause the integrator piston to move to the left and correspondingly further tend to increase fuel flow. As engine speed correspondingly increases, positioning servo piston 20 will return to its former position by movement to the right, thus reestablishing equal flow through orifice 41 of the integrator piston 40 and plate valve 46. The desired static conditions are thus reestablished, but with integrator piston 40 in a new position resulting from its traverse to the left to maintain fuel flow at a new and increased value by the resulting re-positioning of main fuel flow valve 54. In the reverse manner, had engine speed exceeded the desired demand, an inverse sequence of events would take place to effect a correcting traverse of integrator piston 40 to the right, ultimately resulting in a downward engine speed correction.

For the purpose of completeness, it should be understood that the system would additionally include conventional components providing for minimum fuel flow during engine operation to sustain combustion should main fuel valve 54 approach too constricted flow conditions during a negative transient from a high to a low power point. Additionally, thermostatically responsive valve members for by-passing nozzle fuel flow to sump in the event excessive temperatures are encountered at the turbine inlet will be employed as an overriding control on the fuel flow supplied from the control assembly.

The control assembly components thus far described perform quite satisfactorily in maintaining power plant operating speed at a desired or design rate when subject to moderate load fluctuations or other parameters undergoing moderate changes such as thermal value of the fuel. Nonetheless, such a manually throttled control system is of little practical value for starting or for effecting large amplitude speed changes. These deficiencies are largely due to the fact that manual control, during such transients, unless very slowly and precisely applied, will over-fuel the engine and throw the compressor into surge. The most salient of the unique features of the present invention modulate the fuel flow as controlled by the acceleration demand inserted by the speed sensor to prevent over fueling during acceleration and to achieve a fail safe condition in the event of engine "hang-up." The modulator system operates solely in response to compressor discharge pressure and inherently compensates for ambient pressure and temperature variations.

In the embodiment shown in FIGURE 1, compressor discharge pressure is supplied to conduit 91. This pressure is delivered through bore 92 to establish a pressure $P_3$ in chamber 93. Chamber 93 has an expansible volume by reason of diaphragm 94 sealed with the chamber wall by a flexible sealing member 95. Diaphragm 94 is mounted for longitudinal movement by connecting rod 96 supported by bellows 97 and 98. As will further appear, bellows 97 and 98 develop opposed balanced forces responsive to compressor discharge pressure and have a secondary purpose in serving to seal the pneumatic portion of the control. Diaphragm 94, therefore, tends to displace rod 96 to the right by a traverse dependent on the effective spring constant of the two bellows members 97 and 98 with relation to the force developed on diaphragm 94 by the applied compressor discharge pressure.

Movement of diaphragm 94 is, however, opposed by a pressure applied to diaphragm 101 also rigidly mounted on connecting rod 96 for movement with diaphragm 94. Similarly, diaphragm 101 is sealed with its chamber 102 by a similar annular flexible sealing member 103. The space 104 between diaphragms 94 and 101 is vented to the atmosphere by conduit 105 in order that the pressure on the low pressure sides of pistons 101 and 94 be equalized.

Compressor discharge $P_3$, present in chamber 93, is fed to chamber 102 through conduit 106, capillary 107 and conduit 108. Thus, under steady state conditions, pressures $P_3$ and $P_4$ are equal and the longitudinal position assumed by connecting rod 96 is that in which the spring forces exerted by bellows 97 and 98 are in equilibrium. If, however, the compressor discharge pressure is changing, the pressure $P_3$ in chamber 93 varies instantaneously therewith, whereas due to capillary 107, pressure $P_4$ in chamber 102 lags in time to the pressure changes taking place in chamber 93. Movement of connecting rod 96 is therefore dependent both upon the compressor discharge pressure and its rate of change. As will appear below, the displacement of connecting rod 96 is proportional to the ratio of the rate of change of compressor discharge pressure to the sum of the compressor discharge pressure and its time derivative. This may be seen from the following analysis.

The flow through the capillary 107 is defined as:

(1) $$\dot{w} = C^* \frac{P_3}{RT_3}(P_3 - P_4)$$

where:

$\dot{w}$—capillary weight flow, lbs./sec.
$C^*$—capillary coefficient, in.$^3$/p.s.i./sec.
$R$—gas constant for air, in./° R
$P_4$—internal pressure, p.s.i., chamber 102
$P_3$—internal pressure, p.s.i., chamber 93
$T_3$—internal temperature, ° R The term $P_3/RT_3$ is inversely proportional to specific volume and is included as the capillary coefficient given in terms of volume flow per pressure differential. The system is operating in a heat sink caused by fuel flowing through the valves 46 and 110 to the sump to keep the temperature of capillary 107 constant. Therefore, the capillary coefficient $C^*$ changes only with ambient temperature allowing for automatic compensation to ambient temperature changes.

(2) $$X_p = \frac{(P_3 - P_4)A_e}{K}$$

where:

$X_p$—displacement of diaphragm, in.
$A_e$—effective area of movable diaphragm, in.$^2$
$K$—combined spring constant of sealing bellows, lb./in.

The equation of state for the right chamber is:

(3) $$P_4 V_4 = w_4 R T_4$$

where:

$V_4$—volume in chamber 102, in.$^3$
$T_4$—internal temperature, ° R
$w_4$—weight of air in chamber 102, lbs.

The volume in chamber 102 may be defined as:

(4) $$V_4 = V_{4_0} - A_a X_p$$

where:

$V_{4_0}$—volume in chamber 102 at $P_3 = P_4$, in.$^3$
$A_a$—actual cross sectional area of chamber 102, in.$^2$ Differentiating (4):

(5) $$\dot{V}_4 = -A_a \dot{X}_p$$

where:

The dot notation refers to the first derivative with respect to time of the variable it appears over.

Differentiating (3):

(6) $$P_4 \dot{V}_4 + V_4 \dot{P}_4 = R \dot{w}_4 T_4 + R w_4 \dot{T}_4$$

Combining (6) and (1):

(7) $$C^* \frac{P_3}{RT_3}(P_3 - P_4) = \frac{P_4 \dot{V}_4}{RT_4} + \frac{V_4 \dot{P}_4}{RT_4} - \frac{w_4 \dot{T}_4}{T_4}$$

The right side of (7) may be expressed as:

$$\left(\frac{\dot{V}_4}{V_4} + \frac{\dot{P}_4}{P_4} - \frac{\dot{T}_4}{T_4}\right) w_4$$

And since:

$$\frac{\dot{V}_4}{V_4} + \frac{\dot{P}_4}{P_4} >> \frac{\dot{T}_4}{T_4}$$

Equation 7 may be rewritten as:

$$\frac{C^* P_3 RT_4}{RT_3}(P_3 - P_4) = P_4 \dot{V}_4 + V_4 \dot{P}_4$$

During normal operation, temperature differentials between chambers 93 and 102 will be small, therefore, a further simplification can be made in that:

$$\frac{RT_4}{RT_3} \approx 1.0$$

and the finalized version of Equation 7 after integration is:

(8) $$P_4 = \frac{C^* \int P_3(P_3 - P_4) dt}{V_4}$$

combining (8) and (4):

(9) $$P_4 = \frac{C^* \int P_3(P_3 - P_4) dt}{V_{4_0} - A_a X_p}$$

However, to obtain a functional relationship between input and output of the modulator actuating assembly, it is necessary to eliminate $P_4$ from Equation 9 and obtain an expression for $X_p$ in relation to $P_3$.

By combining (9) and (2), the following is established:

(10) $$P_3 - \frac{K X_p}{A_e} = \frac{\frac{C^* K}{A_e} \int P_3 X_p dt}{V_{4_0} - A_a X_p}$$

Rearranging (10):

(11) $$V_{4_0} P_3 - \frac{K V_{4_0}}{A_e} X_p - A_a X_p P_3 + \frac{A_a}{A_e} K X_p^2 = \frac{C^* K}{A_e} \int P_3 X_p dt$$

Differentiating (11):

(12) $$V_{4_0} \dot{P}_3 - \frac{K V_{4_0}}{A_e} \dot{X}_p - A_a \dot{X}_p P_3 - A_a \dot{P}_3 X_p + 2\frac{A_a}{A_e} K X_p \dot{X}_p = \frac{C^* K}{A_e} P_3 X_p$$

Rearranging (12):

$$X_p = \frac{V_{4_0} \dot{P}_3 - \left(\frac{K V_{4_0}}{A_e} + A_a P_3\right) \dot{X}_p}{\frac{C^* K}{A_e} P_3 + A_a \dot{P}_3 - \frac{2 A_a K \dot{X}_p}{A_e}}$$

Then for an equilibrium position where $\dot{X}_p$ is zero:

(13) $$X_p = \frac{V_{4_0} \dot{P}_3}{\frac{C^* K}{A_e} P_3 + A_a \dot{P}_3}$$

In a specific embodiment, the constant $V_{4_0}$ is selected as a substantial multiple of the constant $A_a$. Consequently, at low to moderate values of compressor discharge pressure $P_3$, the displacement $X_p$ is material and substantially proportional to the time derivative of the pressure in chamber 93. As the compressor discharge pressure increases, the denominator of Equation 13 increases rapidly and the displacement of connecting rod 96, for the same rate of increase in compressor discharge pressure, becomes less and less. The displacement signal is thus in itself an analogue of the avalaible acceleration potential of a gas turbine compressor. The orifice 107 is so disposed in casting 175 that the fuel from conduit 42 circulates around the orifice 107 as the fuel returns to the sump to maintain the orifice 107 at constant temperature. Since the compressor discharge pressure is of itself altitude sensitive and the capillary coefficient of orifice 107 is ambient temperature sensitive, the displacement of connecting rod 96 makes an idealized gas turbine acceleration control over a large range of operating conditions. The modulation system, in response to compressor discharge pressure, therefore provides as an engine acceleration function computer whose output, displacement of connecting rod 96, operates through an integrator, piston 40, to modulate the fuel flow. The forces developed by the pneumatic system are applied to the mechanical system wherein the spring constant K established by bellows 97 and 98 determines the response, thus effectively defining the acceleration function demand input signal by comparison generator type action. Accordingly, the spring constant may be selected at a suitable value as a design parameter for any particular application.

As noted above, in the configuration of elements shown in FIGURE 1, the power plant would be operating at a constant design or selected speed under the control of the speed sensor mechanism. The diaphragm stack assembly and connecting rod 96 in such a regime is inoperative. During accelerations, however, as well as in starting, control of fuel flow is dominated by the movement of connecting rod 96 to achieve the purposes of present invention. The associated linkages operated by the diaphragm stack will now be described.

Connecting rod 96 provides a modulating control upon the position of main fuel flow valve 54 through the operation of plate valve 110, operating in conjunction with the terminus of conduit 42, to vary the exit flow conditions from integrator cylinder 37. Plate valve 110 is coupled with connecting rod 96 through member 111 forked at end 112 and pivoted to the control assembly chassis at 113. Plate valve 110 is threadably mounted in member 111 for adjustment to the desired setting in relation to the size of orifice 41 in integrator piston 40. Thus, plate valve 110 controls the pressure in the outlet portion of integrator cylinder 37 in conjunction with plate valve 46 which is responsive to the speed sensor. Arm 111 is biased by spring 114 for engagement with collar 115 on connecting rod 96. During on-speed conditions, plate valve 110 is closed by the engagement of arm 44 with spindle 116 received in housing 117 of arm 111. Spring 118 in housing 117 yields to the pressure exerted by arm 44, as actuated by the positioning servo piston 20, but spring 18 applies sufficient force therefrom to arm 111 to maintain plate valve 110 in a closed position during routine on-speed operation.

Thus, since plate valve 110 is in such a regime saturated closed, fuel control is normally solely responsive to the position of plate valve 46 as controlled by the speed sensor.

Under other conditions, however, control of main fuel supply valve 54 by plate valve 46 is completely overridden by the operation of plate valve 110. We will first consider a starting operation.

Referring to FIGURE 2, when the engine is out of operation, connecting rod 96 assumes an equilibrium position between bellows 97 and 98 which positions plate valve 110 wide open. This operation is achieved through an auxiliary linkage between connecting rod 96 and member 111. For this purpose, collar 121 carried by connecting rod 96 is engaged by forked portion 122 of link 123. Link 123 is maintained in spring biased engagement with collar 121 by an affixed spring 124 engaging collar 115. The other end of link 123 is articulated to member 111 by link 126.

In the static non-operating equilibrium position of connecting rod 96, link 123 engages, as a pivot point, adjustable stud 125 threaded into the chassis of the control assembly. Thus, as shown in FIGURE 2, plate valve 110 assumes a wide open position. Under these circumstances, exit conduit 42 of integrator cylinder 37 is fully vented and upon the application of fuel pump pressure, developed as the power plant is started, integrator piston 40 moves to the right and fully closes main fuel valve 54. Thus, under starting conditions with throttle control 7 advanced for normal operation at idling speed, despite the fact that the positioning servo piston 20 demands fuel flow because of the existing speed error as detected by the speed sensor, substantially no fuel flow will be permitted due to the wide open condition of plate valve 110.

As the engine approaches light-up speed, with the development of substantial compressor discharge pressure and a material value of its first derivative, connecting rod 96 moves to the right as shown in FIGURE 3 and, as link 123 disengages stud 125, link 111 comes into operative engagement with collar 115 and begins to close plate valve 110. This in turn develops pressure in exit conduit 42 from the integrator cylinder 37 and piston 40 thereof begins to move to the left to open the fuel valve as ignition is established. The position assumed by connecting rod 96 during a start will, in response to compressor discharge pressure and its first derivative, properly accelerate the engine for rapid efficient start without encroaching on a compressor stall regime.

As noted above, however, should for some extraneous factor present the plant stall during start, or otherwise hang up during a demand acceleration, fuel flow will be immediately cut back to a safe level by pressure conditions resulting from the stall in chambers 93 and 102. Such a condition is shown in FIGURE 4, where pressure $P_4$ in chamber 102 materially overrides decreasing pressure $P_3$ in chamber 93 to move connecting rod 96 substantially back to its normal equilibrium position wherein link 123 again engages pivot stud 125 to open plate valve 110. Under these circumstances, fuel flow is therefore cut back through main valve 54.

If, however, a normal start has been initiated and carried through with throttle 7 set to idling speed, member 44 will engage spindle 116 carried at the lower end of lever 111 in the configuration shown in FIGURE 1, so that plate valve 110 is held closed and the positioning servo piston assumes control of the fuel flow.

If operating throttle 7 is now reset from idle to design speed, the resulting speed error will cause piston 20 to move to the left and close plate valve 46, tending to reduce the exit flow from the integrator cylinder 37 and increase fuel flow through valve 54. Movement of member 44 resulting from this change of position of the positioning servo piston will free member 111 so that connecting rod 96 may again assume control of plate valve 110. Thus, as the engine accelerates to its design speed, the dynamic response of rod 96 to the compressor discharge pressure in chamber 93 and to the derivative of that pressure in chamber 102, in tending, to open plate valve 110, will modulate the fuel flow to a proper value and one materially lower than would have been established by the sole action of positioning servo piston 20.

As the power plant approaches a design speed, the operating regime becomes increasingly displaced from compressor surge, and at such high speeds of operation it is quite practical, and for some applications it may be highly desirable, to remove any fuel flow modulation effected by movement of connecting rod 96. Under these circumstances, the position of main fuel valve 54 would be under the sole control of the speed sensor through the operation of the positioning servo piston 20. Means are shown in FIGURE 1 for accomplishing this operation, which may be employed when the operating application of the power plant renders it desirable.

It will be noted that the left end of connecting rod 96 carries a terminal collar 130 attached thereto. This collar is positioned between diaphragm 131 and an enclosing cap 132 which, with the diaphragm and annular flexible seal member 133, forms a sealed chamber 134 in which compressor discharge pressure is developed from conduit 135. The compresor discharge pressure admitted at conduit 91 acts against both diaphragms 94 and 131, and the initial force, tending to move rod 96 to the right, is the difference between the forces against diaphragms 94 and 131 due to the difference in surface area. After a sufficient time interval and the turbine is in steady state operation, the pressure in chamber 102 will become equal to the pressure in chambers 93 and 134. Thus, the forces against diaphragms 94 and 101 balance each other and the diaphragm 131 tends to move to the left but is restrained by the force in spring 137. Thus not until the compressor discharge pressure is sufficient to overcome the force of spring 137 which is during normal steady state operation would the rod 96 move to the left. The collar 130 on the end of rod 96 is freely movable within a short axial distance with respect to diaphragm 131 to the extent necessary to cause the turbine to accelerate rapidly without causing compressor surges. The force in spring 137 is adjustable so that the diaphragm 131 would move the rod to the left when design or normal speed is approached, at which time the compressor discharge pressure is sufficient to overcome the force spring 137. Diaphragm 131 then engages collar 130 on the end of connecting rod 96, and moves connecting rod 96 toward the position shown in FIGURE 1 to close plate valve 110 and leave the fuel supply valve 54 under the sole control of the speed sensor and its associated mechanism. Under these circumstances, diaphragm 131 overcomes the differential force on diaphragms 94 and 101, respectively due to compressor discharge pressure and a function of its time derivative.

The forces on diaphragm 131 comprise the product of its area and the value of compressor discharge pressure present in chamber 134, opposed by the product of its area and the pressure in chamber 136 added to the force exerted thereon by spring 137. The pressure in chamber 136 is ambient due to relief conduit 138. The force exerted by spring 137 is adjustable by screw 139 which bears against the outer end of spring 131 through connecting plate 140. If adjusting screw 139 is advanced sufficiently toward diaphragm 131, to overcome any force exerted on the latter in the opposite direction by compressor discharge pressure, the fuel control system will operate as first described.

On the other hand, for a variety of applications, the force exerted by spring 137 may be reduced by unscrewing the adjusting means 139. Under such adjustments, in the upper ranges of power plant rotational speed lying somewhat below and extending to its design speed, diaphragm 131 will be thereby permitted to move to the left to engage collar 130 on connecting rod 96, and by closing plate valve 110 permit the power plant to accelerate to its design speed with the main fuel flow control valve under the direct control of the speed sensor mechanism. In this range, of course, the turbine inlet temperature thermostat may function as a topping fuel limit control reducing the fuel flow established by the speed sensor that is actually delivered to the combustion nozzles.

The operation of the system in FIGURE 1 will be reviewed with reference to the general schematic drawing of FIGURE 5. As shown therein, the power plant comprises compressor 150 driving turbine 151 by the diagrammatically indicated dashed line pneumatic coupling through combustor 152. The turbine drives the compressor through the mechanical coupling indicated as a solid line therebetween. The turbine load may be either pneumatic or mechanical as shown.

The fuel flow to combustor 152 is metered by summing generator 153 (summing bar 63 actuating main fuel valve 54) responsively to integrating control 154 (piston 40) and proportional control 155 (piston 20). The compressor discharge pressure is fed to the engine acceleration function computer 156 (chambers 93 and 102, diaphragms 94 and 101, capillary 107, chamber 134, and diaphragm 131) which actuates the integrating fuel flow control 154 (piston 40) through comparison generator 157 (rod 96, member 111, and valve 110) receiving the force output of the acceleration function computer and determining its resultant output displacement in reference to the designed acceleration function demand, as determined by the setting of valve 110 and spring 137.

The engine speed error is determined at comparison generator 158 (spring 5) with reference to the engine speed (flyweights 1) and speed demand (throttle elements 6, 7, 8, and 9), and these components control the fuel flow through both the integrating control 154 (piston 40) and the proportional control 155 (piston 20).

The schematic of FIGURE 6 represents the application of the fuel flow modulator of the present invention to a free turbine power plant system comprising compressor 160, turbine 161 driven thereby, and free turbine 162 driven by the output of the gas generator system. Here compressor discharge pressure, as in the above discussed embodiments, is applied to the engine acceleration function computer 156. The force output of the latter is applied to comparison generator 157 which establishes the output displacement with relation to the acceleration function demand. The actuator operates through integrating control 154 to control fuel flow to combustor 152. Fuel flow is jointly controlled through summing generator 153 from proportional control 155 responsive to the speed error as determined by the rate input from free turbine 162, and the free turbine speed demand, both fed to comparison generator 158. The speed error, as in the above discussed systems, is also applied to control fuel flow through integrating control 154.

Additionally, the integrating control on the fluid flow may be responsive to the speed error established in a comparison generator receiving inputs determined by the speed of the compressor and a speed demand established for the gas generator. Such a control would comprise, in the system shown in FIGURE 1, an additional plate valve responsive to gas generator speed error arranged at the terminus of a branch conduit connecting with conduit 42, corresponding to the structure employed with plate valve 46 and branch conduit 47. The linkage of such a plate valve, responsive to gas generator speed error would, however, not be mechanically linked with the main fuel valve 54, so that its sole operation would be through an additional control on the output flow conditions of conduit 42, affecting the longitudinal position of integrating piston 40 in cylinder 37 jointly with plate valves 46 and 110 of FIGURE 1.

It will be understood that the system of the present invention may be applied in many mechanical configurations, and that the scope of the invention will be determined with reference to the appended claims.

We claim:
1. A fuel control system for a combustion turbine power plant comprising:
   a combustion chamber for producing combustion products,
   a turbine driven by the combustion products,
   an air compressor mechanically driven by said turbine for producing compressed air for said combustion chamber,
   a fuel pressure source,
   adjustable fuel valve means for controlling the amount of fuel entering said chamber,
   actuator means responsive to the air pressure produced by said compressor to generate a displacement which is a function of the ratio of the time derivative of the discharge pressure to the sum of the discharge pressure and its time derivative and,
   means responsive to the displacement to adjust said valve means so that the amount of fuel entering said chamber responds immediately to changes in the compressor discharge pressure.

2. A fuel flow control system for a combustion turbine power plant comprising:
   a combustion chamber for producing combustion products,
   a turbine driven by the combustion products,
   an air compressor mechanically driven by said turbine for producing compressed air for said combustion chamber,
   a fuel pressure source,
   means for controlling fuel flow from said source to said chamber in dependency on the plant operating conditions, and
   means operative in dependency on the compressor discharge pressure for operating said means for modulating the fuel flow according to a function of the ratio of the time derivative of compressor discharge pressure to the sum of compressor discharge pressure and its time derivative so that the amount of fuel entering said chamber responds immediately to changes in the compressor discharge pressure.

3. A fuel flow control system for a combustion turbine power plant comprising:
   a combustion chamber for producing combustion products,
   a turbine driven by the combustion products,
   an air compressor mechanically driven by said turbine for producing compressed air for said combustion chamber,
   a fuel pressure source,
   means for sensing the turbine speed,
   fuel flow control means for controlling the amount of fuel entering said chamber,
   first operating means for the flow control means, responsive to said means for sensing speed, operative to adjust fuel flow for steady state operation under load variation, and
   second operating means for the flow control means operative in dependency on the compressor discharge pressure for operating said fuel flow control means according to a function of the ratio of the time derivative of compressor discharge pressure to the sum of compressor discharge pressure and its time derivative to cause the amount of fuel entering said chamber to respond immediately to changes in the compressor discharge pressure.

4. The system of claim 3 further including means to inactivate the second control means at design speeds of the plant.

5. A fuel flow control system for a combustion turbine power plant comprising:
   a combustion chamber for producing combustion products,
   a turbine driven by the combustion products,
   an air compressor mechanically driven by said turbine for producing compressed air for said combustion chamber,
   a fuel pressure source,
   adjustable fuel valve means for controlling the flow of fuel from said source to said chamber,
   first actuating means for producing a first displacement that is related to the turbine speed,
   second actuating means for producing a second displacement which is a function of the ratio of the time derivative of compressor discharge pressure to the sum of compressor discharge pressure and its time derivative, so that there is no second displacement when said discharge pressure is constant regardless of its value;

first fuel valve operating means for controlling said valve means in response to the first displacement, and second fuel valve operating means for controlling said valve means in response to said second displacement so that the amount of fuel entering said chamber responds immediately to changes in the compressor discharge pressure.

6. The structure of claim 5 wherein the combustion turbine power plant comprises a free turbine and the first actuating means is responsive to free turbine speed.

7. The structure of claim 5 further comprising:

means linking the first actuating means with the second actuating means for inactivating the second activating means at steady state speeds of the power plant.

8. A fuel control system for a combustion turbine power plant comprising:

a combustion chamber for producing combustion products, a turbine driven by the combustion products, an air compressor mechanically driven by said turbine for producing compressed air for said combustion chamber, a fuel pressure source, adjustable fuel valve for controlling the amount of fuel entering said chamber, cylinder means enclosing a piston having a restrictive orifice therethrough which piston is coupled to said fuel valve means, means for supplying fluid under pressure to one end of said cylinder, venting conduit means connected with the other end of said cylinder, turbine speed responsive actuating means coupled to said fuel valve, first valve means coupled to said venting conduit means and responsive to the speed responsive actuating means for controlling the flow of fluid in said conduit means to control the position of said piston within said cylinder, second valve means also coupled to said conduit means and for also controlling the flow of fluid in said conduit means to control the position of said piston within said cylinder, and second actuating means operative responsively to compressor discharge pressure to furnish an actuating displacement which is a function of the ratio of the time derivative of compressor discharge pressure to the sum of compressor discharge pressure and its time derivative for governoring the amount of fluid said second valve means allows to flow through said conduit means.

9. The structure of claim 8 wherein the second actuating means includes means to open the second valve means in the absence of compressor discharge pressure.

10. The structure of claim 8 further including means resiliently coupling the speed responsive actuating means with the second actuating means for inactivating the second actuating means and far rendering it nonresponsive to compressor discharge pressure during steady state operation of the power plant.

11. In a fuel flow control system for a combustion turbine power plant including a combustion chamber for producing combustion products, a turbine driven by the combustion products, an air compressor mechanically driven by said turbine for producing compressed air for said combustion chamber, and a fuel pressure source for supplying fuel to said chamber, a fuel flow modulator comprising:

a first chamber, a second chamber, first conduit means for pressurizing the first chamber with compressed air at compressor discharge pressure, second conduit means including a flow restrictive element for pressurizing the second chamber with air at a pressure which is a function of the time derivative of the compressor discharge pressure, actuator means differentially responsive to the pressures in the chambers to produce a displacement proportional to the difference in pressure between the two chambers, fuel flow control means responsive to the displacement of said actuator means operative to reduce fuel flow during increase of compressor discharge pressure, and means for thermally coupling the flow restrictive element with circulating engine fuel whereby the element is ambient temperature responsive to vary the rate of flow therethrough.

12. In a fuel flow control system for a combustion turbine power plant including a combustion chamber for producing combustion products, a turbine driven by the combustion products, an air compressor mechanically driven by said turbine for producing compressed air for said combustion chamber, and a fuel pressure source for supplying fuel to said chamber, a fuel flow modulator comprising:

a first chamber, a second chamber, first conduit means for pressurizing the first chamber with compressed air at compressor discharge pressure, second conduit means including a flow restrictive element for pressurizing the second chamber with air at a pressure which is a function of the time derivative of the compressor discharge pressure, actuator means differentially responsive to the pressures in the chambers to produce a displacement proportional to the difference in pressure between the two chambers, fuel flow control means responsive to the displacement of said actuator means operative to reduce fuel flow during increase of compressor discharge pressure, third chamber means having a movable wall portion, third conduit means for pressurizing the third chamber with compressed air at compressor discharge pressure, said movable wall portion being pressurized externally of the third chamber at ambient pressure, means applying an inwardly directed resilient preload force to the movable wall portion, and means coupling the movable wall portion with the fuel flow control means to oppose its response to the actuator means when the compressor discharge pressure is at an upper range of compressor discharge pressure.

References Cited

UNITED STATES PATENTS

| | | | |
|---|---|---|---|
| 2,857,741 | 10/1958 | Evers | 60—39.16 |
| 3,012,401 | 12/1961 | Harner | 60—39.28 |
| 3,172,259 | 3/1965 | North | 60—39.29 X |

JULIUS E. WEST, *Primary Examiner.*